United States Patent

Land

[15] 3,672,283
[45] June 27, 1972

[54] PHOTOGRAPHIC APPARATUS

[72] Inventor: Edwin H. Land, Cambridge, Mass.
[73] Assignee: Polaroid Corporation, Cambridge, Mass.
[22] Filed: Nov. 12, 1970
[21] Appl. No.: 88,847

Related U.S. Application Data

[63] Continuation-in-part of Ser. No. 28,567, April 15, 1970.

[52] U.S. Cl. ................................................. 95/11 R, 95/42
[51] Int. Cl. .................................. G03b 19/02, G03b 19/12
[58] Field of Search ................................................ 95/42, 11

[56] References Cited

UNITED STATES PATENTS

| | | | |
|---|---|---|---|
| 1,298,641 | 4/1919 | Barnes et al. | 95/42 X |
| 2,043,539 | 6/1936 | Harrison et al. | 95/42 X |
| 3,241,469 | 3/1966 | Hulcher | 95/42 |
| 3,424,070 | 1/1969 | Nyman | 95/11 |

*Primary Examiner*—John M. Horan
*Assistant Examiner*—Kenneth C. Hutchison
*Attorney*—Brown and Mikulka, Alfred Corrigan and Lawrence Norris

[57] ABSTRACT

An interface between a film container and a reflecting member mounted within a camera of the single-lens reflex type for defining a lighttight seal substantially at or closely adjacent to the exposure plane of the camera.

The camera includes a chamber for receiving a film container, a reflecting member mounted for movement between a first position in which it is located substantially parallel with and closely adjacent to the camera's exposure plane containing a photosensitive element and in which it cooperates with the film container to form a lighttight seal about the photosensitive element and a second position in which it directs an image toward the photosensitive element located in position for exposure within the film container. The lighttight seal allows access to the interior of the camera to be made without prematurely exposing one of the photosensitive elements.

6 Claims, 3 Drawing Figures

INVENTOR.
EDWIN H. LAND
BY Brown and Mikulka
and
Alfred E. Corrigan
ATTORNEYS

PHOTOGRAPHIC APPARATUS

CROSS-REFERENCE TO RELATED APPLICATION

This is a continuation-in-part of my copending application Ser. No. 28,567 filed April 15 1970.

BACKGROUND OF THE INVENTION

1. Field of the Invention

This invention relates to photographic apparatus of the single-lens reflex type and to film containers adapted for use with cameras of the aforementioned type and, more particularly, to a structural interface between the film container and a movably mounted reflecting member located within the camera whereby reflecting member forms a lighttight seal with the film container substantially at the exposure plane of the camera when the reflecting member is in the reflex or viewing position. The lighttight seal substantially eliminates the need for other cameral light seals of high integrity since some degree of light leakage is now permissible so long as it is not of sufficient magnitude to effect the film unit during its relatively short exposure interval. This lighttight seal also allows the operator of the camera greater freedom of access to the interior of the camera without fear of premature exposure of a film unit. For example, the camera's processing rolls may be moved to a position which facilitates cleaning thereof without fear of prematurely exposing a film unit.

2. Description of the Prior Art

The operation of cameras of the single-lens reflex type is well known and generally includes the steps of (1) viewing and focusing an image of the subject through the camera's objective lens and (2) actuating the shutter release button to (a) close the shutter, (b) move the camera's reflecting member to a position which allows exposure of a film unit and (c) operate the shutter to expose the film unit. In order to prevent exposure of the film unit during the viewing and focusing part of the operation, a light barrier must be erected to prevent premature exposure of the film unit. One proposed solution is to form a light barrier by moving a suitable opaque structure such as a reflecting member into engagement with other structure of the camera to form a lighttight tunnel wherein the opaque structure and the film unit define opposite ends of the tunnel such as that shown in U.S. Pat. No. 3,426,666. Another solution proposed is moving the reflecting member into lighttight engagement with cameral structure located substantially adjacent the exposure plane of the camera as shown in U.S. Pat. No. 2,914,997. The obvious problem with the first proposal is that not only must there by a lighttight engagement between the reflecting member and the walls of the tunnel but also the walls of the tunnel must not have any light leads, e.g., pinholes. This problem is partially solved by reducing the length of the tunnel to a minimum as shown in U.S. Pat. No. 2,914,997. However, where the light seal is formed by two or more components of the cameral itself, there still remains a problem that a light leak may develop in the seal due to the constant wear between the contacting surfaces which form the light seal as the reflecting member is moved during each exposure cycle.

The operation of cameras of the single-lens reflex type which also include means for processing the exposed film unit is generally the same as that set forth above except for the further step of moving the exposed film unit through a pair of pressure-applying members, e.g., a pair of processing rolls. As the film unit enters the bite of the rolls, a pod, located near the leading end of the film unit, containing a processing liquid is ruptured and the liquid spread over the photosensitive element of the film unit to initiate a diffusion transfer process. Occasionally, a small portion of the processing liquid may inadvertently come into contact with the processing rolls and if allowed to remain, it may cause slippage and uneven compression of subsequently processed film units. If permitted to accumulate and harden, it will produce protuberances on the surface of the roll. For the foregoing reasons, it may become necessary to clean the processing rolls prior to exposing a subsequent film unit in order to ensure a proper spread of the processing liquid. Since these rolls may define part of the camera structure for preventing passage of light from the exterior of the camera to the compartment which houses the film assemblage, the removal of the rolls for cleaning can result in light entering this compartment. Should this cleaning become necessary while the camera still contains a supply of film units, some provision must be made to form the lighttight barrier around the photosensitive element of the film units in such a manner as to maintain the integrity of the lighttight barrier while the rolls have been moved to a position wherein they may be cleaned.

SUMMARY OF THE INVENTION

The invention relates to cameras of the single-lens reflex type and to film assemblages specifically adapted for use therewith. The camera includes a chamber for receiving and supporting a film assemblage including a film container having a light-transmitting section and a plurality of film units located in position for exposure of the forwardmost film unit located within the container. A reflecting member is pivotally mounted within the camera for movement between a first position wherein it lies in a plane substantially adjacent the plane containing the forwardmost film unit and parallel therewith and a second exposure position in which it directs an image toward the forwardmost film unit. The reflecting member includes reentrant flanges which cooperate with the light-transmitting section to form a lighttight seal about the photosensitive element of the forwardmost film unit to protect it against premature exposure during the focusing cycle of the camera and when the interior of the camera has been opened to ambient light, e.g., the camera's processing rolls have been moved to a cleaning position wherein light is admitted into the chamber. The reentrant flanges on the reflecting member may be made from any suitable material having a greater resistance to wear than that of the cooperating structure of the light-transmitting section in the film container thereby ensuring a periodic replacement of the portion of the light seal most susceptible to wear.

An object of the invention is to provide in a camera of the single-lens reflex type including a movably mounted reflecting means, means coupled with the reflection means for cooperating with a film container for forming a lighttight seal about the photosensitive element of a film unit substantially at the exposure plane of the camera when the reflecting means is in a viewing position.

Another object of the invention is to provide in a camera of the type described including a movably mounted reflecting means and a chamber for receiving a film container, means coupled with the reflecting means for cooperating with the film container to form a lighttight seal about the photosensitive element of the forwardmost film unit located in the film container when the reflecting means is in a viewing position and the chamber is open to ambient light.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 3 is an enlarged elevation view, partly in section, of a pair of processing rolls shown in a position wherein they may be cleaned.

DETAILED DESCRIPTION OF THE INVENTION

Figure 1:
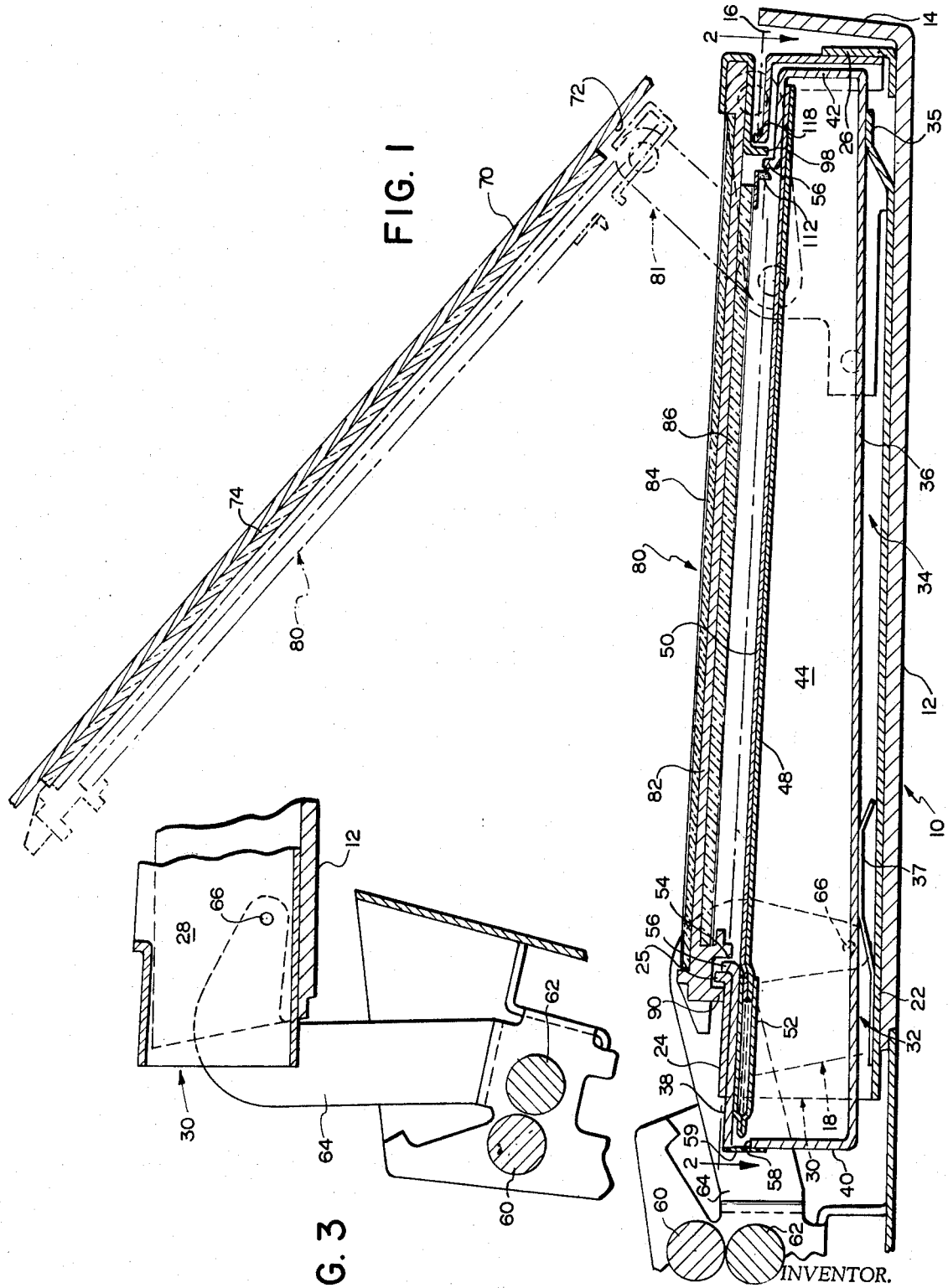
FIG. 1 is a sectional elevation view of a portion of a self-developing, single-lens reflex camera.

Reference is now made to FIG. 1 of the drawings wherein is shown a portion of the interior of a camera of the self-developing, single-reflex type similar to that shown in my copending application Ser. No. 28,567, filed April 15, 1970. The camera includes a first housing section 10 having a rear wall 12, a trailing end wall 14, a pair of side walls 16, only one of which is shown, and an open leading end 18. Mounted within housing section 10 is an inner frame member comprised of a rear wall 22, a forward wall 24, a trailing end wall 26, side walls 28, only one of which is shown, and an open end 30, all of which cooperate to define a chamber 32 for receiving a film container 34 adapted to be periodically replaced subsequent to the exposure of all of the photosensitive elements contained therein.

Film container 34 is of the general type shown in the copending application of Irving Erlichman entitled "Apparatus" Ser. No. 67,051 filed Aug. 26, 1970, and assigned to the assignee of the instant application. The film container 34 includes a rear wall 36, a forward wall 38, leading and trailing end walls 40 and 42, respectively, and side walls 44, only one of which is shown. Stacked within film container 34 are a plurality of film units 46 (only one bring shown for purposes of clarity) each of which includes a photosensitive element 48, a transparent image receiving element 50 and a pod 52 containing a processing liquid which is adapted to be spread between the elements 48 and 50 to initiate a diffusion transfer process as more fully described in my U.S. Pat. No. 3,415,644 granted on Dec. 4, 1968, and assigned to the same assignee as the instant application. Forward wall 38 includes a generally rectangular-shaped, light-transmitting section 54 defined by an endless rib 56, section 54 being substantially coextensive with the photosensitive element 48. Leading end wall 40 includes a slot 58 which extends substantially from one side wall 44 to the other for permitting the passage of a film unit therethrough. An elongated flap 59 suitably attached to forward wall 38 seals the slot 58 against the passage of light therethrough.

The open end 30 of chamber 32 is closed by a roller assembly including a pair of rolls 60 and 62 mounted on a bracket 64. Bracket 64 is pivotally mounted to side walls 28 at 66 for movement between the operative position shown in FIG. 1 wherein it substantially prevents the passage of light through open end 30 of chamber 32 and is adapted to receive a film unit for processing as it exits from the container 34 and an inoperative position, as shown in FIG. 3, wherein it is pivoted downwardly to a position wherein a film container can be inserted into or removed from chamber 32 or the rolls 60 and 62 may be cleaned. It should be noted that the above concept of pivoting the roller assembly to the inoperative position to allow loading of the camera and/or cleaning of the rolls is not my invention but was derived from Christopher R. Rice, an employee of the assignee of the instant application.

A second housing section 70 extends upwardly from first housing section 10 and at an acute angle therewith. Housing section 70 includes an interior wall 72 upon which is mounted a generally planar reflecting surface 74. A reflecting means 80 is pivotally coupled to a linkage system 81, shown diagrammatically, for movement between a first position (shown in solid lines in FIG. 1) wherein it functions as a component of the camera's viewing system and a second position (shown in broken lines) wherein it functions as a components of the camera's exposure system as more fully described in my aforementioned copending patent application.

Figure 2:
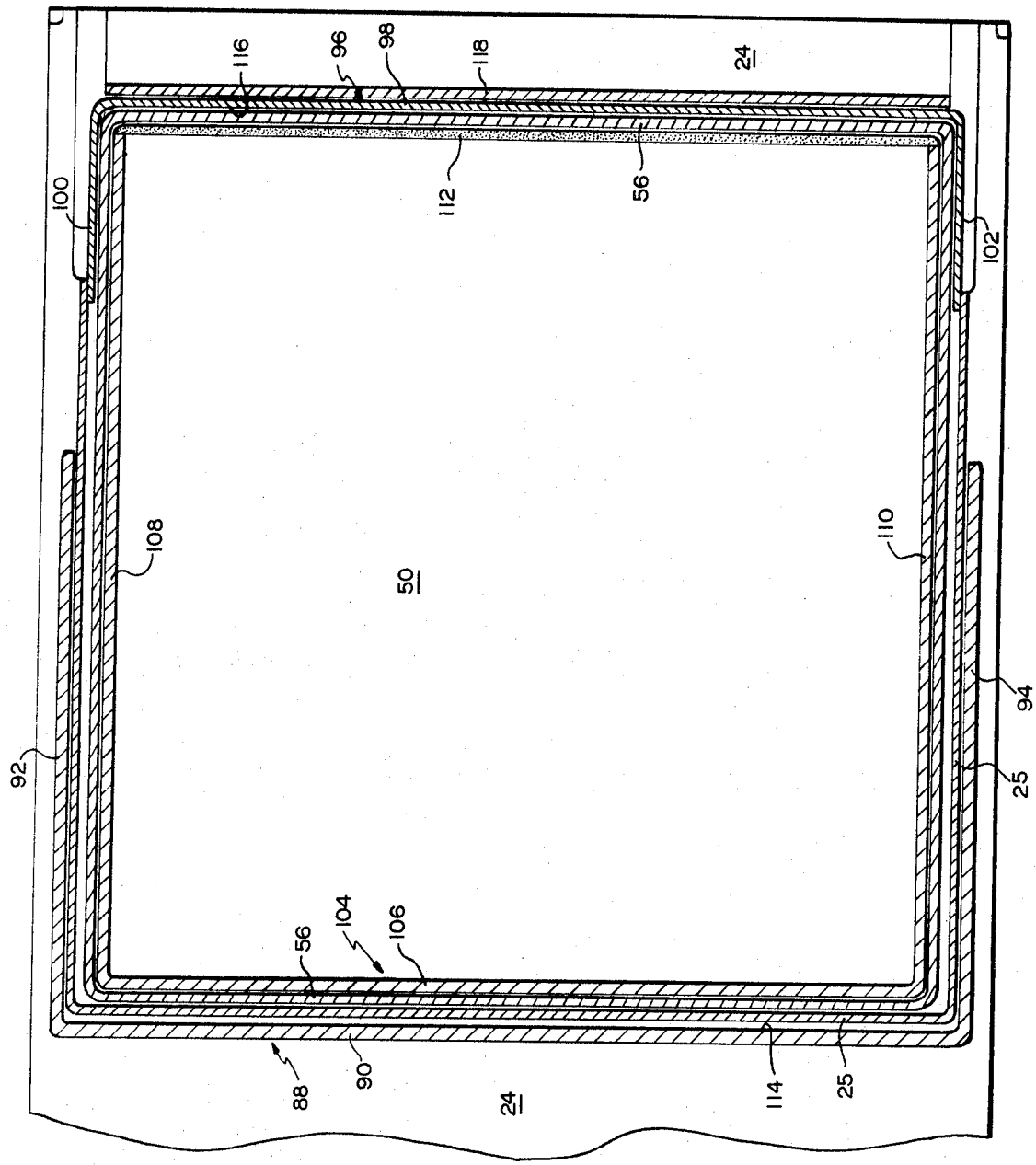
FIG. 2 is a sectional view taken along the line 2—2 of FIG. 1.

Reflecting means 80 includes a mirror mount 82 which carries a Fresnel-type mirror 84 on one side thereof and a substantially planar mirror 84 on the opposite side thereof. Extending outwardly from mirror mount 82 is a first generally U-shaped flange 88 (see FIG. 2 ) having a laterally extending portion 90 and longitudinally extending portions 92 and 94. A second generally U-shaped flange 96 having a laterally extending portion 98 and longitudinally extending portions 100 and 102 extends outwardly from mirror mount 82 and cooperates with flange 88 to substantially define a rectangle. Positioned within the rectangle defined by flanges 88 and 96 and extending from mirror mount 82 is a third generally U-shaped flange 104 having a laterally extending portion 106 and longitudinally extending portions 108 and 110. A laterally extending flange 112 formed from any suitable resilient material, e.g., flocking or plastic, is attached to mirror mount 82 and is in engagement with the free ends of portions 108 and 110 to define a second rectangle. As can be seen in FIG. 2, U-shaped flanges 88 and 104 cooperate to define a generally U-shaped recess or passage 114 therebetween which is adapted to receive the rib 56 on film container 34 and a U-shaped flange 25 extending upwardly from forward wall 24 when the reflecting means 80 is in the down or viewing position shown in solid lines in FIG. 1. U-shaped flange 96 and flange 112 cooperate to define a second recess 116 which is adapted to receive that portion of rib 56 which is closest to and parallel with the trailing end wall 14. Also extending upwardly from wall 24 is a transversely extending flange 118 which cooperates with a portion of flange 56 to receive flange 98 when the reflecting means is in the down position.

Prior to operation of the camera, the rolls 60 and 62 are moved to the position shown in FIG. 3 and the film container 34 inserted into chamber 32 via opening 30. The film container is guided into the position shown in FIG. 1 by a ramp 35 and a spring 37 extending upwardly from rear wall 22. The ramp 35 and spring 37 urge the film container 34 upwardly until rib 56 enters recesses 114 and 116. The resiliency of flange 112 ensures that the rib 56 will enter or leave recess 116 during loading and unloading of the film container.

In operation, the various components of the camera are in the solid line position shown in FIG. 1 when the user is focusing his subject. The image of the subject is transmitted by the camera's lens toward reflecting surface or mirror 74 which in turn redirects and forms the image on the Fresnel-type mirror 84 which again redirects the image to the camera's viewfinder as described in my aforementioned patent application. During this viewing and focusing cycle, actinic light is prevented from striking the photosensitive element 48 because of the labyrinth-like light seal formed by the cooperation between the rib 56 on film container 34 and the flanges 88, 96, 104 and 112 located on the movable mirror mount 82. After the subject has been properly focused, the camera's shutter release button is depressed to initiate the camera's exposure cycle, i.e., the shutter and viewfinder are closed to prevent admission of light into the camera and the reflecting means or member 80 is moved to the broken line position shown in FIG. 1. When the reflecting means 80 reaches the up position, the shutter is again opened for a predetermined period of time to expose the forwardmost film unit through the exposure aperture 54 in film container 34. The shutter is again closed and the reflecting means 80 moved the the down position. The exposed film unit is then removed from the film container 34 by any suitable apparatus such as that shown in the aforementioned copending Erlichman application and advanced into the bite of rolls 60 and 62. The rolls 60 and 62 rupture the pod 52 and spread the liquid therein between the photosensitive and image-receiving elements 48 and 50 to initiate a diffusion transfer process as described previously. The camera's shutter and viewfinder are again conditioned to allow light into the camera in preparation for the next exposure. If at this time, i.e., when the shutter and viewing systems have been conditioned to allow the passage of light into the camera, it is desired to gain access to any of the camera structure e.g., the processing rolls 60 and 62, the user merely moves the rolls to the position shown in FIG. 3 wherein they are readily accessible for cleaning. Again, the labyrinth-type seal between the film container 34 and the reflecting means 80 prevents exposure of the forwardmost film unit by actinic light entering chamber 32 by way of opening 30 and the light entering by way of the shutter and viewing systems.

Although the foregoing labyrinth-type seal has been described as including a rectangularly-shaped exposure aperture telescopingly receiving a similarly shaped flange within it, it is within the scope of the invention to have the flange telescopingly receive the rib defining the exposure aperture within the confines of the flange.

From the foregoing it can be seen that there has been disclosed a novel labyrinth-type light seal between a film container and a movably mounted reflecting means. The light seal is made substantially at the exposure plane of the camera thereby enabling the chamber which houses the film container to be opened to ambient light without fear of prematurely exposing the forwardmost film unit within the film container. Also, since the light seal includes a portion of the film container, periodic replacement of a portion of the seal is automatically accomplished upon the insertion of each new film container.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising:
   a film container of the type adapted to be periodically replaced in said photographic apparatus subsequent to exposure of all of the photosensitive elements therein, said film container including a light-transmitting section;
   a plurality of photosensitive elements located within said film container and adapted for exposure to actinic light transmitted by said light-transmitting section;
   reflecting means mounted within said photographic apparatus for movement between a first position in which said reflecting means is located substantially adjacent to the exposure plane of said photographic apparatus and one of said photosensitive elements and a second position wherein said reflecting means directs an image toward the photosensitive element located in position for exposure; and
   means extending from at least one of said film container and said reflecting means and adapted to cooperate with the other of said film container and said reflecting means for forming a lighttight seal substantially around the perimeter of said photosensitive element substantially at said exposure plane when said reflecting means is in said first position.

2. Photographic apparatus as defined in claim 1 wherein said means includes flange means extending from said reflecting means, said flange means enclosing an area at least equal to that of said photosensitive element.

3. Photographic apparatus as defined in claim 2 wherein said means includes rib means extending from said container, said rib means defining an area at least equal to that of said light-transmitting section.

4. Photographic apparatus as defined in claim 3 wherein one of said flange means and said rib means is adapted to telescopically receive the other of said flange means and said rib means for defining a labyrinth-type seal about said photosensitive element when said reflecting means is in said first position.

5 Photographic apparatus as defined in claim 1 wherein said means includes rib means extending from said container, said rib means defining an area at least equal to that of said light-transmitting section.

6. Photographic apparatus including support means for supporting a film container of the type adapted to be periodically replaced subsequent to exposure of all of the photosensitive elements therein, comprising:
   reflecting means;
   means for mounting said reflecting means for movement between a first position in which said reflecting means is located substantially adjacent to the exposure plane of said apparatus and one of said photosensitive elements and a second position wherein said reflecting means directs an image toward the photosensitive element located in position for exposure; and
   means coupled with said reflecting means and adapted to cooperate with the film container for forming a lighttight seal substantially at the said exposure plane whereby said photosensitive element located in position for exposure is shielded from actinic light while said reflecting means is in said first position.

* * * * *